Aug. 16, 1960

C. C. RAYBURN 2,949,570

LOW VALUE WOUND CAPACITOR

Filed Sept. 25, 1957

INVENTOR.
Charles C. Rayburn
BY
George W. Price
ATTY.

United States Patent Office 2,949,570
Patented Aug. 16, 1960

2,949,570
LOW VALUE WOUND CAPACITOR

Charles C. Rayburn, Falls Church, Va., assignor, by mesne assignments, to Illinois Tool Works, Chicago, Ill., a corporation of Illinois Filed Sept. 25, 1957, Ser. No. 686,069

3 Claims. (Cl. 317—260)

This invention relates to electrical capacitors and more particularly to wound capacitors of small capacity adapted for use in radio receiving circuits and the like.

Heretofore, in the manufacture of conventional low value wound electrical capacitors, comprising one-half inch wide electrode foils separated by a one-half inch wide dielectric strip, 4700 mmf. was approximately the lowest value possible with adequate mechanical strength remaining. By decreasing the width of the electrode foils and increasing the thickness of the dielectric strip, values as low as 100 mmf. were attainable, with high rejection resulting from winding dispersion. Due to the lack of a suitable low value wound capacitor, relatively expensive ceramic capacitors have heretofore been used exclusively below 1000 mmf.

It is, therefore, an object of the present invention to provide a relatively inexpensive low value wound capacitor structure adapted for use in place of ceramic capacitors for values from 4700 mmf. to under 100 mmf.

Another object of the invention is to provide a low value wound capacitor structure in which two spaced narrow electrode foils overlap opposite ends of a relatively wide intermediate floating foil, with dielectric tape therebetween, whereby the floating foil constitutes a series connection between two elemental capacitors.

A further object of the invention is to provide a low value wound capacitor in which the electrode foils and the dielectric tape are wound to provide the number of convolutions required for producing a rigid package with ample electrode foil at the ends thereof to insure strong soldered connections to their respective terminals.

Another object of the invention is to provide a low value wound capacitor structure in which the floating foil is centrally positioned between the two electrode foils to provide two capacitors of equal value with equal active areas, the two capacitors thus being connected in series to reduce the value as measured across the electrode foils to one-half the value of either series capacitor.

Another object of the invention is to provide a low value wound series capacitor in which the floating foil, electrode foils and dielectric tape may be of any width consistent with dielectric strength and value requirements.

Another object of the invention is to provide a low value wound series capacitor in which the length and area of the floating foil is materially less than the length and combined areas of the electrode foils, whereby the near final value is attained when the floating foil is cut during the winding operation.

Another object of the invention is to provide a low value wound series capacitor adapted to be flattened and to have its electrode foils soldered to terminals of printed circuits provided on module wafers or base panels.

Another object of the invention is to provide a wound series capacitor structure embodying two series capacitors of equal value whereby the voltage rating may be doubled over conventional wound capacitors as only one-half the potential appears across each capacitance.

Another object of the invention is to provide a wound series capacitor structure in which the convolutions of the intermediate floating foil spiral axially of the structure to produce a current flow therein, whereby the structure is useful in producing a tuned circuit capable of self-resonance.

The invention embodies other novel features, details of construction and arrangement of parts which are hereinafter set forth in the specification and claims and illustrated in the accompanying drawings, wherein:

Figure 1:
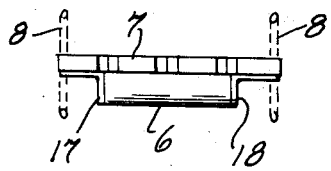
Fig. 1 is a side elevation showing a low value wound capacitor as mounted on a ceramic wafer of a module structure.
Figure 2:
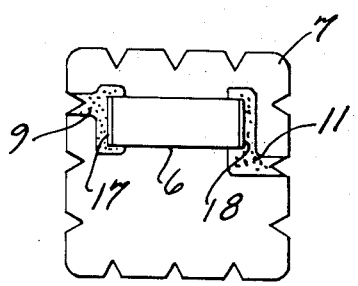
Fig. 2 is a bottom plan view of the structure of Figure 1.

Referring now to the drawings for a better understanding of the invention, and more particularly to Figs. 1 and 2 therein, a low value wound capacitor 6 is shown as mounted on a ceramic wafer 7, adapted to be connected to other wafers by a plurality of riser wires 8 to form a module, as shown and described in Patent 2,774,014, issued Dec. 11, 1956, to R. L. Henry, Jr., for use as a complete electronic device or as a subassembly with other modules or other circuits. Electrical conductors 9 and 11 are formed on the wafer to lead from their respective riser wires 8 to the capacitor 6.

Wound capacitors have heretofore been electrically connected to conductors on module wafers by means of clamps and/or solder, and it has, therefore, been necessary to form the capacitor with sufficient electrode metal to form a rigid package adapted to be firmly secured to the wafer. As a result thereof, conventional wound capacitors having values below 4700 mmf. were not suitable for use on module wafers and relatively expensive ceramic capacitors have been provided on the wafers.

To provide a low value wound capacitor having good physical properties and adequate electrode metal to provide a rigid, secure connection to wafer conductors, the present invention contemplates a structure in which two electrode foils 12—12 overlap opposite ends of an intermediate or floating foil 13, with dielectric tapes 14 and 16 therebetween, whereby the floating foil serves as a series connection between two elemental capacitors. By centrally positioning the floating foil 13 between two axially spaced electrode foils 12—12 to provide two capacitors of equal value with equal active areas, the two capacitors are thus connected in series to reduce the value as measured across the electrode foils to one-half the value of either series capacitor.

To further reduce the value of the series capacitor, without decreasing its physical strength or reducing the electrode metal thereof, the floating foil 13 is cut to a length substantially less than the length of the electrode foils 12—12 and dielectric tapes 14 and 16 during the winding process, whereby the near final value is attained when the floating foil is cut.

Figure 3:
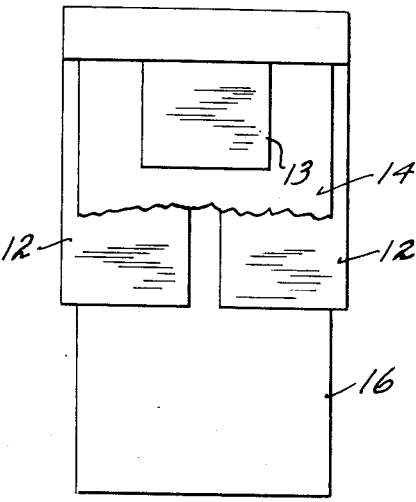
Fig. 3 is a plan view illustrating the arrangement of the foils and dielectric during the winding of the capacitor of Figures 1 and 2, in accordance with the invention.
Figure 4:
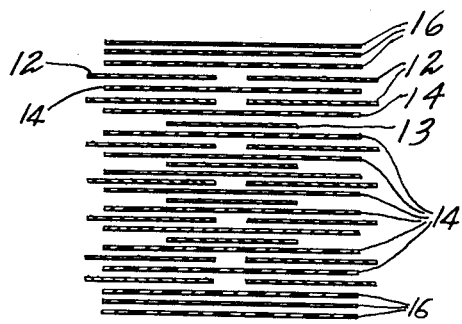
Fig. 4 is a diagrammatic, expanded view of the capacitor, illustrating the arrangement of the electrode foils, floating foil and dielectric tapes of the device of Figure 1, in accordance with the invention.

During the winding process, as illustrated in Figs. 3 and 4, the floating foil 13 is centrally positioned on the dielectric tape 14, and the electrode foils 12—12 are equidistantly spaced on opposite sides of the longitudinal axis of the floating foil and separated therefrom by the inner dielectric tape 14. The outer dielectric tape 16 extends along the outer side of the electrode foils 12—12 and is wound against the inner face of the floating foil during the winding process. The inner and outer dielectric tapes 14 and 16 are of greater width than the floating foil 13 and have their side edges spaced inwardly from the outer side edges of the electrode foils 12—12.

As the foils and tapes are being convolutely wound, the floating foil 13 is cut to provide a predetermined capacitor value, but the winding of the electrode foils 12—12 and tapes 14 and 16 continues to provide a capacitor having the desired physical properties and electrode metal; after which, the electrode foils and the inner tape 14 are cut prior to the severance of the outer tape 16. After severance, the end of the outer tape is adhesively united to the underlying convolution thereof by the application of a heated electric iron thereto.

In mounting the capacitor 6 on a module wafer 7, as illustrated in Figs. 1 and 2, molten solder is applied to the projecting spiral rim portions of the electrode foils 12—12 to form terminal disks 17 and 18 connected to their respective conductors 9 and 11 on the wafer when the solder solidifies.

The floating foil 13 and the electrode foils 12—12 may be of equal width and thickness and formed of metal, such as tin foil. To provide a less expensive capacitor, the floating foil 13 may be formed of aluminum which costs less and has better winding characteristics than tin foil. The tapes 14 and 16 may be formed of any suitable heat-sealable dielectric material, such as polyethylene terephthalate.

It is contemplated that the floating foil 13 and the electrode foils 12—12 may all be formed of aluminum; in which event, the projecting spiral rim portions of the electrode foils of the capacitor are coated with metal, such as copper, prior to the application of the molten solder thereto to form the connection between the electrode foils and their respective conductors 9 and 11.

Low value wound capacitors have been made on a capacitor winding machine of the type shown and described in a copending application of John C. Thorson et al., Serial No. 582,363, the capacitors comprising electrode foils 12—12 of ¼ inch, 40 gage tin foil, a floating foil 13 of ⅜ inch, 20 gage tin foil, and dielectric tapes 14 and 16 of ½ inch, 50 gage Mylar tape. The foils and dielectric tapes were wound with 20 turns, and then 10 additional wraps of tape. The capacitors thus formed had a value of 800 mmf. and did not break down when subjected to 5000 volts D.C. for approximately 15 seconds' duration.

It will thus be understood that capacitors having values below 100 mmf. may be obtained merely by terminating the floating foil early in the winding cycle, and that the capacitors thus formed will have good physical properties and adequate electrode metal by continuing the winding of the electrode foils and dielectric tapes after termination of the floating foil.

While the floating foil 13 has been shown and described as being centrally positioned between the electrode foils 12—12, it will be understood that the floating foil may be offset slightly from its central position, or may spiral axially, without departing from the invention.

I claim:

1. A convolutely wound series capacitor unit of predetermined low value below 4700 mmf. comprising a centrally located floating foil of predetermined width and length, spaced electrode foils disposed on the same side of said floating foil and each spaced from the other and overlapping opposed side marginal areas of said floating foil and electrically insulated one from the other, and dielectric tapes insulatingly interposed between said floating foil and said electrode foils, each of said electrode foils having a spiral side marginal portion projecting beyond a different one of the side edges of said dielectric tapes to provide a pair of relatively large electrical terminals for said capacitor unit, the area of said floating foil being substantially less than the areas of said electrode foils and dielectric tapes and the length of said floating foil being substantially less than the lengths of each of said electrode foils and dielectric tapes whereby a capacitor having electrical terminal areas of relatively high mechanical strength are provided and said capacitor may have a predetermined low value determined by the length of said floating foil.

2. The capacitor unit of claim 1 wherein each of the electrode foils and the floating foil are of substantially the same width.

3. A capacitor according to claim 1 wherein said floating foil is formed of aluminum.

References Cited in the file of this patent

UNITED STATES PATENTS

| 1,841,628 | Pickard | Jan. 19, 1932 |
| 2,053,334 | Hetenyi | Sept. 8, 1936 |
| 2,774,014 | Henry | Dec. 11, 1956 |
| 2,884,605 | Dubilier | Apr. 28, 1959 |

FOREIGN PATENTS

| 563,084 | Great Britain | July 28, 1944 |